Patented Apr. 25, 1950

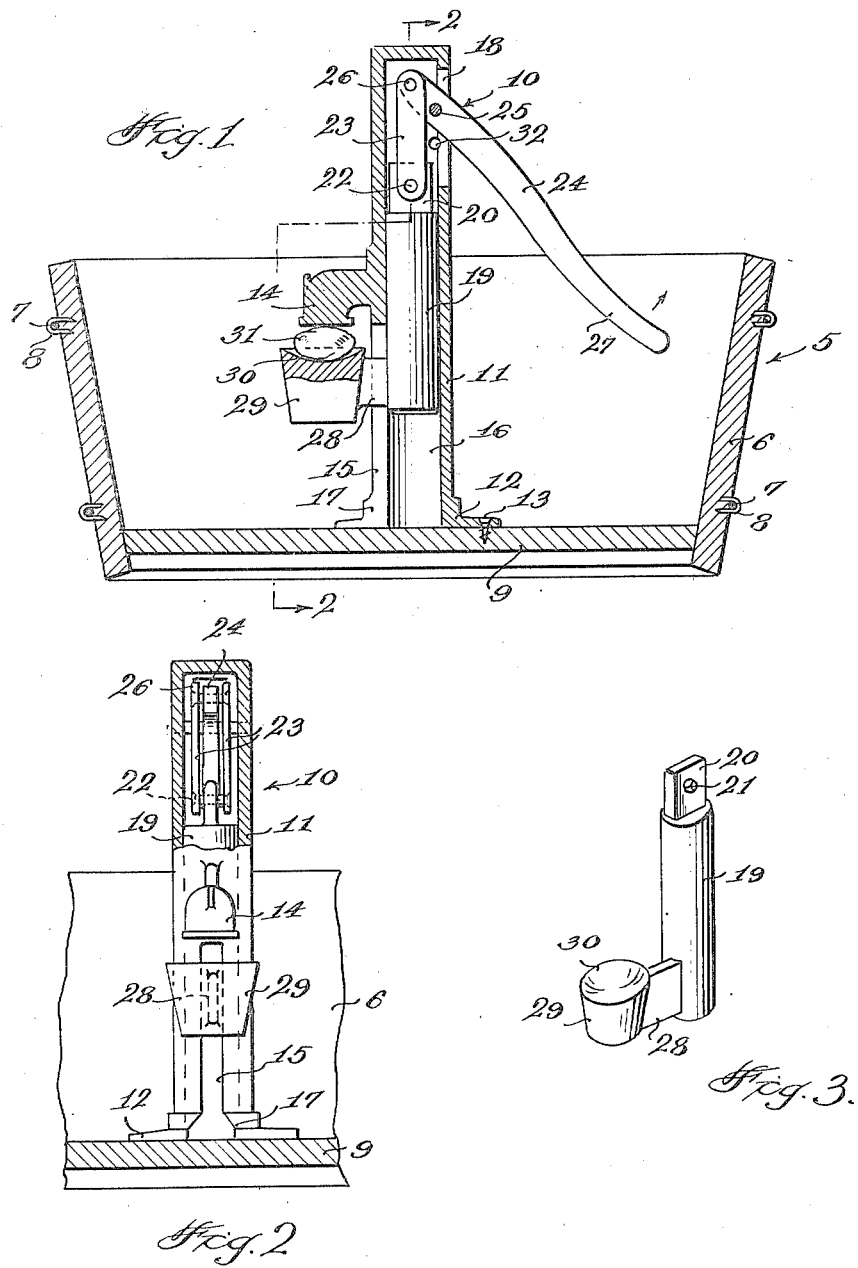

2,505,538

UNITED STATES PATENT OFFICE 2,505,538

MECHANICAL NUTCRACKER WITH RECIPROCATING BREAKER JAW

Lawrence R. Gehrke, Little Chute, Wis.

Application April 23, 1948, Serial No. 22,917

3 Claims. (Cl. 146—14)

This invention relates to a novel construction of mechanical nut cracker which is constructed to simulate an old fashioned wooden well pump and which will be extremely efficient and durable for its intended purpose.

Another object of the invention is to provide a nut cracker including a fixed jaw and a movable jaw provided with means affording ample leverage for moving the movable jaw toward the fixed jaw for cracking a nut disposed between said jaws.

Still a further object of the invention is to provide a nut cracker wherein the movable jaw will be normally displaced by gravity away from the fixed jaw and toward an open position for receiving a nut therein and which is so constructed that the nut will be readily supported by the movable jaw both before and after being cracked.

A further object of the invention is to provide a nut cracker wherein the movable jaw is constructed to simulate a pail or bucket and the fixed jaw the spout of a pump.

Still another object of the invention is to provide a nut cracker adapted to be fixedly secured in a bowl or other receptacle for containing nuts and/or nut shells.

Still a further object of the invention is to provide a nut cracker of extremely simple construction comprising a minimum of parts, which may be economically manufactured and sold and which will be extremely efficient and durable in use.

Various other objects and advantages of the invention will hereinafter become more fully apparent from the following description of the drawing, illustrating a presently preferred embodiment thereof, and wherein:

Figure 1 is a central vertical sectional view, partly in side elevation of the nut cracker shown supported in a bowl or receptacle likewise shown in vertical section;

Figure 2 is a front elevational view, partly in vertical section taken substantially along a plane as indicated by the line 2—2 of Figure 1, and Figure 3 is a perspective view of one element of the nut cracker.

Referring more specifically to the drawing, the numeral 5 designates generally a bowl or receptacle which may be formed of any suitable material such as wood and which may be of any desired size and shape and which preferably includes an annular upwardly diverging, frustoconical side wall 6 which is braced at a plurality of points by wires or other bindings 7 extending therearound and secured to the outer side thereof by staples 8. The bowl or receptacle 5 also includes a substantially flat bottom 9 which is suitably secured to the wall 6 so that the under side thereof is preferably disposed above the level of the bottom edge of said wall.

The nut cracking unit, designated generally 10 includes a hollow standard 11 which is closed at its upper end and open at its lower end and the lower end of which is provided with an external enlargement forming a base 12 which is adapted to rest on the bottom 9 and to be secured thereto in any suitable manner such as by means of a plurality of screw fastenings 13. The standard 11 is preferably circular in cross section and the bore thereof is likewise preferably circular in cross section although it could be of any desired cross sectional shape. The standard 11 is provided intermediate of its ends with an integral projection shaped to simulate a pump spout and to carry out the simulation afforded by the standard 11 which is shaped to simulate a pump housing. This extension extends radially outwardly from the standard 11 and is provided with a down turned outer portion forming a stationary jaw 14. The standard 11 is provided with a slot 15 which communicates with the hollow interior or bore 16 thereof and which extends vertically from beneath and adjacent the stationary jaw 14 downwardly through the base 12 so that said slot 15 is open at its lower end and said slot is enlarged at its lower end or in the portion thereof formed in the base 12, as seen at 17 and as best illustrated in Figure 2. The standard 11 is also provided with a longitudinally extending slot 18 adjacent its upper end and on the opposite side thereof to the slot 15.

An elongated core 19 is shaped and sized to slidably engage the bore 16 and is provided with a restricted shank 20 at its upper end having an opening 21 therein for receiving a pivot pin 22 which pivotally engages corresponding ends of a pair of links 23 for pivotally connecting said links to the core 19 and with said links straddling the extension 20 at their lower ends, as seen in Figure 2.

An elongated lever 24 extends through the slot 18 and is pivotally connected to the standard 11 adjacent its inner end by a pivot pin 25 which extends loosely therethrough and which is supported by the standard 11. The inner end of the lever 24 which is located adjacent the pivot 25 has a pivot pin 26 extending therethrough and on which the opposite, upper ends of the links 23 are rotatably mounted. The links 23 likewise straddle the lever 24 and form the connection between the lever and the core 19. The opposite, outer end of the lever 24 forms a handle 27 which is swingable into and out of the receptacle 5.

The core 19 at its lower end or adjacent thereto is provided with an extension or arm 28 which projects radially therefrom and which is adapted to slidably engage the slot 15. An impact member or movable jaw 29 is formed integral with the outer end of the arm 28 and has an upper concave surface 30 which is disposed beneath and in opposed relationship to the downwardly facing end or surface of the fixed jaw 14. The impact member 29 is shaped to simulate a pail or bucket and it will be readily apparent that the slot 17 in the base 12 is enlarged to permit passage of a portion of the member 29 therethrough so that when the pin 25 is removed the lever 24 can be swung outwardly through the slot 18 for disengaging the links 23 from the pivot pin 26 after which, assuming that the standard 11 is disconnected from the bottom 9, the core 19 will be removed through the open bottom of said standard 11 and the arm 28 can pass downwardly and outwardly of the standard through the slot 15 and its portion 17. Similarly, the core 19 can be applied to the standard 11 through its open bottom and with the impact member 29 passing through the enlarged slot portion 17 and the arm 28 moving upwardly through the slot 17 and slot 15, after which the links 23 can be swung outwardly through the slot 18 for attaching the lever 24 to the upper ends of said links and prior to the lever being pivotally connected to the standard 11 by the pivot pin 25.

From the foregoing it will be readily apparent that the weight of the core 19 and its parts 28 and 29 will normally cause said parts to move by gravity to a point adjacent the lower end of the standard 11 for swinging the handle end 27 of the lever 24 upwardly. With the member 29 thus disposed, a nut 31 can be readily positioned in its recessed upper end 30. The lever handle 27 can then be manually engaged for swinging the lever 24 downwardly and to its position of Figure 1 to thereby elevate the core 19 and the impact member or movable jaw 29 for causing the impact member 29 to move toward the stationary jaw or anvil 14 for cracking the nut 31 between said parts. Upon release of the lever handle 27 the core 19 and jaw 29 will drop downwardly so that the cracked nut 31 can be removed from the concave surface 30 and another nut placed thereon to be cracked. For the purpose of cracking larger nuts, the housing 11 is provided with an opening 32 below the level of the pivot pin 25 as illustrated in Figure 1 and in which said pivot pin can be positioned for displacing the core and movable jaw downwardly with respect to the housing and stationary jaw 14.

It will be readily apparent that the bowl or receptacle 5 is adapted to contain nuts and/or nut shells and in combination with the cracking unit 10 will provide an attractive and efficient nut cracker and bowl.

Various modifications and changes are contemplated and may obviously be resorted to, without departing from the spirit or scope of the invention as hereinafter defined by the appended claims.

I claim as my invention:

1. A mechanical nut cracker comprising an elongated hollow standard having an integral externally disposed stationary jaw intermediate of its ends, a core freely slidable in said standard, said standard having a longitudinal slot extending below said stationary jaw, an arm projecting from said core and slidably disposed in said slot, a movable jaw or impact member carried by said arm and disposed externally of the standard and beneath said stationary jaw and for movement toward and away from the stationary jaw, an elongated lever having one end extending into the standard adjacent its upper end and pivotally connected adjacent said end to the standard, and link means pivotally connecting said end of the lever to the upper end of the core whereby when the opposite, longer end of the lever is swung downwardly said core and impact member will be moved upwardly relatively to the standard and stationary jaw, said movable jaw and core being normally urged by gravity away from the stationary jaw and to adjacent the lower end of the standard and for positioning the longer end of the lever in an elevated position.

2. A nut cracker as in claim 1, said standard having a slot adjacent its upper end and on the opposite side thereof to the first mentioned slot for loosely receiving said lever.

3. A nut cracker as in claim 1, said slot extending through the lower end of the standard to permit the core to be applied to or removed from the housing through the lower end thereof.

LAWRENCE R. GEHRKE.

REFERENCES CITED

The following references are of record in the file of this patent:

UNITED STATES PATENTS

| Number | Name | Date |
|--------|------|------|
| 259,902 | Muller | June 20, 1882 |
| 699,529 | Hutchinson | May 9, 1902 |
| 1,013,168 | Jankosky | Jan. 2, 1912 |
| 1,014,664 | Myers | Jan. 16, 1912 |
| 1,289,351 | Abt | Dec. 31, 1918 |
| 2,345,731 | Coyle | Apr. 4, 1944 |